US012617711B2

(12) United States Patent
He et al.

(10) Patent No.: US 12,617,711 B2
(45) Date of Patent: May 5, 2026

(54) PRE-SINTERED CERAMIC BLOCK FOR DENTAL RESTORATION, PREPARATION METHOD THEREFOR AND USE THEREOF

(71) Applicant: Shenzhen Upcera Dental Technology Co., Ltd., Shenzhen (CN)

(72) Inventors: Lingling He, Benxi (CN); Guoyi Song, Benxi (CN); Cheng Hou, Benxi (CN); Chengwei Han, Benxi (CN); Zhongliang Zhao, Benxi (CN); Jialing Li, Benxi (CN)

(73) Assignee: Shenzhen Upcera Dental Technology Co., Ltd., Shenzhen (CN)

( * ) Notice: Subject to any disclaimer, the term of this patent is extended or adjusted under 35 U.S.C. 154(b) by 1239 days.

(21) Appl. No.: 17/603,753

(22) PCT Filed: Apr. 15, 2019

(86) PCT No.: PCT/CN2019/082763
§ 371 (c)(1),
(2) Date: Oct. 14, 2021

(87) PCT Pub. No.: WO2020/210958
PCT Pub. Date: Oct. 22, 2020

(65) Prior Publication Data
US 2022/0177358 A1 Jun. 9, 2022

(51) Int. Cl.
*C03C 10/00* (2006.01)
*A61C 13/00* (2006.01)
(Continued)

(52) U.S. Cl.
CPC ...... *C03C 10/0009* (2013.01); *A61C 13/0022* (2013.01); *C03B 19/063* (2013.01);
(Continued)

(58) Field of Classification Search
None
See application file for complete search history.

(56) References Cited

U.S. PATENT DOCUMENTS 10,206,761 B2 2/2019 Burke et al.
10,470,854 B2 11/2019 Burke et al.
(Continued)

FOREIGN PATENT DOCUMENTS

CN 104334506 A 2/2015
CN 104334509 A 2/2015
(Continued)

OTHER PUBLICATIONS

PCT International Search Report and the Written Opinion mailed Jan. 15, 2020, issued in related International Application No. PCT/CN2019/082763, with partial English translation (12 pages).
(Continued)

*Primary Examiner* — Amber R Orlando
*Assistant Examiner* — Paul Alan Forsyth
(74) *Attorney, Agent, or Firm* — Sheppard Mullin Richter & Hampton LLP

(57) ABSTRACT

Disclosed is a pre-sintered ceramic block for a dental restoration, which has a low pre-sintering temperature, contains a silica main crystal phase, but does not contain or contains a small amount of lithium metasilicate crystal phase. The pre-sintered ceramic block has a low hardness, with a Vickers hardness of 0.5-3 GPa, which is significantly lower than that of a ceramic block containing a lithium metasilicate crystal phase, and same is suitable for dry machining and also wet machining when being machined into a dental restoration.

18 Claims, 3 Drawing Sheets

(51) Int. Cl.

| | | |
|---|---|---|
| *C03B 19/06* | (2006.01) | |
| *C03C 4/00* | (2006.01) | |
| *C03C 4/02* | (2006.01) | |

(52) U.S. Cl.
CPC .............. *C03C 4/0021* (2013.01); *C03C 4/02* (2013.01); *A61C 2201/002* (2013.01); *C03C 2204/04* (2013.01)

(56) References Cited

U.S. PATENT DOCUMENTS

| | | | | |
|---|---|---|---|---|
| 2009/0256274 | A1* | 10/2009 | Castillo | C03C 10/0027 501/63 |
| 2014/0200129 | A1* | 7/2014 | Durschang | C03C 10/0009 501/32 |
| 2015/0140513 | A1* | 5/2015 | Burke | C03C 3/083 501/27 |
| 2017/0057865 | A1* | 3/2017 | Kim | C03C 3/097 |
| 2018/0282204 | A1* | 10/2018 | Rampf | C03C 3/097 |
| 2021/0196437 | A1* | 7/2021 | Seger | C03C 4/0021 |

FOREIGN PATENT DOCUMENTS

| | | |
|---|---|---|
| CN | 104909571 A | 9/2015 |
| CN | 105174724 A | 12/2015 |
| CN | 105217959 A | 1/2016 |
| EP | 3168199 A1 | 5/2017 |
| EP | 3059214 B1 | 8/2018 |
| RU | 2169712 C1 | 6/2001 |
| RU | 2611809 C2 | 3/2017 |
| RU | 2612707 C2 | 3/2017 |
| WO | 2009/126317 A1 | 10/2009 |
| WO | 2012/175450 A1 | 12/2012 |
| WO | 2013/167722 A1 | 11/2013 |
| WO | 2015/173394 A1 | 11/2015 |

OTHER PUBLICATIONS

PCT International Preliminary Report on Patentability mailed Oct. 28, 2021, issued in related International Application No. PCT/CN2019/082763, with English translation (13 pages).

Extended European Search Report dated Mar. 21, 2022, issued in related European Application No. 19925234.7 (71 pages).

Office Action dated Jun. 14, 2022, issued in related Russian Application No. 2021132737, with English translation (17 pages).

P.W. McMillan, "Glass-Ceramics", Academic Press, 1967, with English translation.

Request for the Submission of an Opinion (Second Office Action) dated Feb. 27, 2024, issued in related Korean Patent Application No. 10-2021-7034932, with English machine translation (12 pages).

\* cited by examiner

PRE-SINTERED CERAMIC BLOCK FOR DENTAL RESTORATION, PREPARATION METHOD THEREFOR AND USE THEREOF

CROSS REFERENCE TO RELATED APPLICATION

This application is a national stage application under 35 U.S.C. § 371 of International Patent Application No. PCT/CN2019/082763, filed on Apr. 15, 2019, and entitled "Pre-Sintered Ceramic Block for Dental Restoration, Preparation Method Therefor and Use Thereof." The entirety of the aforementioned application is incorporated herein by reference.

FIELD OF INVENTION

The present application relates to the technical field of a dental restoration, in particular to a pre-sintered ceramic block for a dental restoration, a preparation method, and use thereof.

BACKGROUND OF THE INVENTION

The ChairSide restorative system is a dental restorative system formed by introducing computer-aided design and manufacture into the field of restorative dentistry.

The ChairSide restorative system, which is convenient and rapid, and breaks through traditional denture manufacturing procedures such as teeth grinding, mold fabricating, wax carving, and porcelain, allows a 3D camera to directly capture the teeth image immediately after the teeth are ground and trimmed by a dentist, and then transfers the image to the computer in real-time, and processes the ceramic blocks into a dental restoration by the automatic ceramic block grinder with the assistance of the computer.

Since the emergence of ChairSide restorative systems, the development of dental restorative materials suitable for ChairSide restorative systems has become the focus of researchers at home and abroad.

It has been found that dental restorations made from lithium disilicate glass-ceramic materials have both outstanding aesthetic effects and good mechanical properties. However, lithium disilicate glass-ceramic materials have high hardness and poor processability, making it difficult to apply in ChairSide repair system.

In order to solve the problem, the prior art discloses that lithium metasilicate glass ceramics with lithium metasilicate as a main crystal phase are obtained through pre-sintering at a lower temperature, then is subjected to mechanical processing to obtain a restoration shape, and then to dense-sintering at a higher temperature, to finally obtain a glass ceramic restoration with lithium disilicate as a main crystal phase; since the hardness of lithium metasilicate is lower than that of lithium disilicate, the processability is improved. Even so, the Vickers hardness of the ceramic block with lithium metasilicate as the main crystal phase still reaches 5-6 GPa, the ceramic block is only suitable for being machined by a wet method and is not suitable for dry machining, if the lithium metasilicate glass ceramic is machined by a dry method, the problem of incomplete edge or incomplete processing or even the problem of the ceramic block damage may occur, and the machine needle can be easily damaged; therefore, how to develop a pre-sintered ceramic block with lower hardness and suitable for dry machining has become a crucial problem.

SUMMARY OF THE INVENTION

The present application provides a pre-sintered ceramic block for a dental restoration, which is used for solving the problem that lithium metasilicate glass ceramic has high hardness and not suitable for dry machining. Correspondingly, the present application provides a method of preparing a pre-sintered ceramic block for a dental restoration.

The present application also provides a method of preparing a ceramic block for the dental restoration and a method of preparing a dental restoration.

Specific technical solutions are as follows:

According to a first aspect of the present application, there is provided a pre-sintered ceramic block for a dental restoration, wherein the pre-sintered ceramic block contains a silica main crystal phase, has a Vickers hardness of 0.5-3 GPa, preferably 1-2.5 GPa, and is opaque.

In some embodiments of the first aspect of the present application, the pre-sintered ceramic block does not contain a lithium metasilicate crystal phase.

In some embodiments of the first aspect of the present application, the pre-sintered ceramic block has a three-point bending strength of 10-110 MPa; preferably 10-90 MPa; more preferably 30-70 MPa.

In some embodiments of the first aspect of the present application, the pre-sintered ceramic block comprises the following components:

$SiO_2$ 55-85% wt, preferably 55-80% wt, more preferably 60-80% wt, most preferably 64-75% wt, $Li_2O$: 10-25% wt, preferably 12-25% wt, more preferably 13-17% wt, $ZrO_2$ 0-10% wt, preferably 0-8% wt, more preferably 0-6% wt, most preferably 0-4% wt, $Al_2O_3$: 0.3-8% wt, preferably 0.5-6% wt, more preferably 0.5-5% wt, most preferably 0.5-4% wt, $La_2O_3$: 0-7% wt, preferably 0-5% wt, more preferably 0-4.5% wt, most preferably 0-4% wt, ZnO: 0-10% wt, preferably 0-8% wt, more preferably 0-7% wt, most preferably 0.1-5% wt, $K_2O$: 0.1-10% wt, preferably 0.1-9% wt, more preferably 0.1-7% wt, most preferably 0.5-4.5% wt, $GeO_2$: 0.1-7% wt, preferably 0.1-6% wt, more preferably 0.3-5% wt, most preferably 0.5-4% wt, nucleating agent: 0-10% wt, preferably 0-8% wt, more preferably 0.5-8% wt, most preferably 0.5-5% wt, colorant: 0-10% wt, preferably 0-8% wt, more preferably 0-6% wt, most preferably 0.1-5% wt, and other additives: 0-15% wt, preferably 0-10% wt, more preferably 0-4% wt; wherein the nucleating agent is one of or a combination of at least two of $P_2O_5$, $TiO_2$, $V_2O_5$, $Cr_2O_3$, and $Fe_2O_3$;

the other additives are one of or a combination of at least two of $B_2O_3$, F, $Na_2O$, BaO, SrO, CaO, and MgO.

In some embodiments of the first aspect of the present application, the colorant is a glass colorant or a ceramic colorant; preferably, the glass colorant is oxides of at least one of vanadium, chromium, manganese, iron, cobalt, nickel, copper, cerium, praseodymium, neodymium, samarium, promethium, terbium, dysprosium, holmium, erbium, thulium, ytterbium, and europium; the ceramic colorant is one of or a combination of at least two of zirconium iron red, zirconium cerium praseodymium yellow, and nickel black.

According to a second aspect of the present application, there is provided a method for preparing the pre-sintered ceramic block for a dental restoration of the first aspect described above, comprising the steps of:

(1) preparing a matrix glass powder;

(2) putting the prepared matrix glass powder into a mould, and carrying out pressing molding to obtain a matrix glass body; and (3) pre-sintering the matrix glass body under a vacuum condition to obtain a pre-sintered ceramic block, wherein a sintering temperature during pre-sintering is 530-590° C.

In some embodiments of the second aspect of the present application, the matrix glass powder comprises the following components:

SiO$_2$ 55-85% wt, preferably 55-80% wt, more preferably 60-80% wt, most preferably 64-75% wt, Li$_2$O: 10-25% wt, preferably 12-25% wt, more preferably 13-17% wt, ZrO$_2$ 0-10% wt, preferably 0-8% wt, more preferably 0-6% wt, most preferably 0-4% wt, Al$_2$O$_3$: 0.3-8% wt, preferably 0.5-6% wt, more preferably 0.5-5% wt, most preferably 0.5-4% wt, La$_2$O$_3$: 0-7% wt, preferably 0-5% wt, more preferably 0-4.5% wt, most preferably 0-4% wt, ZnO: 0-10% wt, preferably 0-8% wt, more preferably 0-7% wt, most preferably 0.1-5% wt, K$_2$O: 0.1-10% wt, preferably 0.1-9% wt, more preferably 0.1-7% wt, most preferably 1-7% wt, GeO$_2$: 0.1-7% wt, preferably 0.1-6% wt, more preferably 0.3-5% wt, most preferably 0.5-4% wt, nucleating agent: 0-10% wt, preferably 0-8% wt, more preferably 0.5-8% wt, most preferably 0.5-5% wt, colorant: 0-10% wt, preferably 0-8% wt, more preferably 0-6% wt, most preferably 0.1-5% wt, and other additives: 0-15% wt, preferably 0-10% wt, more preferably 0-4% wt;

wherein the nucleating agent is one of or a combination of at least two of P$_2$O$_5$, TiO$_2$, V$_2$O$_5$, Cr$_2$O$_3$, and Fe$_2$O$_3$; the other additives are one of or a combination of at least two of B$_2$O$_3$, F, Na$_2$O, BaO, SrO, CaO, and MgO.

In some embodiments of the second aspect of the present application, the sintering temperature during pre-sintering is 530-560° C.

In some embodiments of the second aspect of the present application, the sintering temperature during pre-sintering is 570-590° C.

In the solution of the present application, for the components of the pre-sintered ceramic block, it has substantially the same composition as the matrix glass powder.

In some embodiments of the second aspect of the present application, the matrix glass powder may be prepared by the following method:

(A1) selecting suitable matrix raw materials such as carbonate, oxide, and fluoride according to all components contained in the matrix glass powder, grinding and mixing the matrix raw materials, and melting at 1250-1650° C. for 0.5-3 h to prepare a matrix molten glass;

(B1) water-quenching the matrix molten glass to obtain glass fragments, and then drying the glass fragments at 100-150° C. for 1-2 h; and (C1) grinding the dried glass fragments to obtain a matrix glass powder.

In some embodiments of the second aspect of the present application, the matrix glass powder may also be prepared by the following method:

preparing at least two kinds of monochromatic matrix glass powder, and then mixing the prepared monochromatic matrix glass powder according to a required color ratio to obtain matrix glass powder used for preparing pre-sintered ceramic blocks; wherein each monochromatic matrix glass powder may be prepared according to the following method:

(A2) selecting suitable matrix raw materials such as carbonate, oxide, and fluoride, grinding and mixing the matrix raw materials, and melting at 1250-1650° C. for 0.5-3 h to prepare a monochromatic matrix molten glass;

(B2) water-quenching the monochromatic matrix molten glass to obtain monochromatic glass fragments, and then drying the monochromatic glass fragments at 100-150° C. for 1-2 h; and (C2) grinding the dried monochromatic glass fragments to obtain monochromatic matrix glass powder.

In other embodiments of the second aspect of the present application, the matrix glass powder may also be prepared by the following method:

(A3) according to the components contained in the matrix glass powder, grinding and mixing the matrix raw materials corresponding to other components except for colorants, such as carbonate, oxide, fluoride, etc., and melting at 1250-1650° C. for 0.5-3 h to prepare a matrix molten glass;

(B3) water-quenching the matrix molten glass to obtain glass fragments, and then drying the glass fragments at 100-150° C. for 1-2 h; and (C3) grinding the dried glass fragments and uniformly mixing with the colorant to obtain a matrix glass powder.

In this embodiment, the colorant is added in step (C3), so that the influence on the coloring effect of the colorant in the high-temperature melting process can be avoided;

In a particular implementation, some colorants with poor coloring capability such as CeO$_2$ can also be added in step (A3); other colorants are added in step (C3).

In some embodiments of the second aspect of the present application, water-quenching of the molten glass may be achieved by pouring the molten glass into cold water; the cold water is generally referred to 0-40° C. of water.

In some embodiments of the second aspect of the present application, an average particle size of the matrix glass powder is 1-100 μm, preferably 1-50 μm, more preferably 5-20 μm. The inventors of the present application have found that the better the uniformity of the average particle size of the matrix glass powder, the better the denseness of the dense-sintered lithium disilicate glass ceramic product, and the more uniform the crystallization, resulting in higher strength and visible light transmittance and closer to the texture of natural teeth.

According to a third aspect of the present application, there is also provided a pre-sintered ceramic block for a dental restoration, wherein the pre-sintered ceramic block contains a silica main crystal phase, has a Vickers hardness of 0.5-3 GPa, preferably 1-2.5 GPa, is opaque, and exhibits a gradual transmittance and/or color after dense-sintering at 800-1100° C. In some embodiments of the third aspect of the present application, the pre-sintered ceramic block may exhibit a gradual transmittance after dense-sintering. In some embodiments, the pre-sintered ceramic block may exhibit a gradual color after dense-sintering. In other embodiments, the pre-sintered ceramic block may exhibit a gradual transmittance and color after dense-sintering. Since the pre-sintered ceramic block provided by the present application can be applied to a dental restoration, the transmittance and/or color displayed by the pre-sintered ceramic block after dense-sintering can be close to and consistent with the characteristics of natural teeth; the aesthetic effect of the restoration is improved.

In some embodiments of the third aspect of the present application, the pre-sintered ceramic block does not contain a lithium metasilicate crystal phase.

In some embodiments of the third aspect of the present application, the pre-sintered ceramic block has a three-point bending strength of 10-110 MPa; preferably 10-90 MPa; more preferably 30-70 MPa.

In some embodiments of the third aspect of the present application, the pre-sintered ceramic block comprises the following components:

SiO$_2$ 55-85% wt, preferably 55-80% wt, more preferably 60-80% wt, most preferably 64-75% wt, Li$_2$O: 10-25% wt, preferably 12-25% wt, more preferably 13-17% wt, ZrO$_2$ 0-10% wt, preferably 0-8% wt, more preferably 0-6% wt, most preferably 0-4% wt, Al$_2$O$_3$: 0.3-8% wt, preferably 0.5-6% wt, more preferably 0.5-5% wt, most preferably 0.5-4% wt, La$_2$O$_3$: 0-7% wt, preferably 0-5% wt, more preferably 0-4.5% wt, most preferably 0-4% wt, ZnO: 0-10% wt, preferably 0-8% wt, more preferably 0-7% wt, most preferably 0.1-5% wt, K$_2$O: 0.1-10% wt, preferably 0.1-9% wt, more preferably 0.1-7% wt, most preferably 0.5-4.5% wt, GeO$_2$: 0.1-7% wt, preferably 0.1-6% wt, more preferably 0.3-5% wt, most preferably 0.5-4% wt, nucleating agent: 0-10% wt, preferably 0-8% wt, more preferably 0.5-8% wt, most preferably 0.5-5% wt, colorant: 0-10% wt, preferably 0-8% wt, more preferably 0-6% wt, most preferably 0.1-5% wt, and other additives: 0-15% wt, preferably 0-10% wt, more preferably 0-4% wt;

wherein the nucleating agent is one of or a combination of at least two of P$_2$O$_5$, TiO$_2$, V$_2$O$_5$, Cr$_2$O$_3$, and Fe$_2$O$_3$;

the other additives are one of or a combination of at least two of B$_2$O$_3$, F, Na$_2$O, BaO, SrO, CaO, and MgO.

In some embodiments of the third aspect of the present application, the colorant is a glass colorant or a ceramic colorant; preferably, the glass colorant is oxides and/or salts of at least one of vanadium, chromium, manganese, iron, cobalt, nickel, copper, cerium, praseodymium, neodymium, samarium, promethium, terbium, dysprosium, holmium, erbium, thulium, ytterbium, and europium; the ceramic colorant is one of or a combination of at least two of zirconium iron red, zirconium cerium praseodymium yellow, and nickel black.

According to a fourth aspect of the present application, there is provided a method for preparing the pre-sintered ceramic block for a dental restoration of the third aspect described above, comprising the steps of:

(1) preparing at least two matrix glass powders with different transmittance and/or color;

(2) putting the prepared at least two matrix glass powder into a mould in the order of transmittance and/or color gradient, and carrying out pressing molding to obtain a matrix glass body; and (3) pre-sintering the matrix glass body under a vacuum condition to obtain a pre-sintered ceramic block, wherein a sintering temperature during pre-sintering is 530-590° C.

In some embodiments of the fourth aspect of the present application the matrix glass powder comprises the following components:

SiO$_2$ 55-85% wt, preferably 55-80% wt, more preferably 60-80% wt, most preferably 64-75% wt, Li$_2$O: 10-25% wt, preferably 12-25% wt, more preferably 13-17% wt, ZrO$_2$ 0-10% wt, preferably 0-8% wt, more preferably 0-6% wt, most preferably 0-4% wt, Al$_2$O$_3$: 0.3-8% wt, preferably 0.5-6% wt, more preferably 0.5-5% wt, most preferably 0.5-4% wt, La$_2$O$_3$: 0-7% wt, preferably 0-5% wt, more preferably 0-4.5% wt, most preferably 0-4% wt, ZnO: 0-10% wt, preferably 0-8% wt, more preferably 0-7% wt, most preferably 0.1-5% wt, K$_2$O: 0.1-10% wt, preferably 0.1-9% wt, more preferably 0.1-7% wt, most preferably 1-7% wt, GeO$_2$: 0.1-7% wt, preferably 0.1-6% wt, more preferably 0.3-5% wt, most preferably 0.5-4% wt, nucleating agent: 0-10% wt, preferably 0-8% wt, more preferably 0.5-8% wt, most preferably 0.5-5% wt, colorant: 0-10% wt, preferably 0-8% wt, more preferably 0-6% wt, most preferably 0.1-5% wt, and other additives: 0-15% wt, preferably 0-10% wt, more preferably 0-4% wt;

wherein the nucleating agent is one of or a combination of at least two of P$_2$O$_5$, TiO$_2$, V$_2$O$_5$, Cr$_2$O$_3$, and Fe$_2$O$_3$; the other additives are one of or a combination of at least two of B$_2$O$_3$, F, Na$_2$O, BaO, SrO, CaO, and MgO.

In some embodiments of the fourth aspect of the present application, the sintering temperature during pre-sintering is 530-560° C.

In some embodiments of the fourth aspect of the present application, the sintering temperature during pre-sintering is 570-590° C.

In some embodiments of the fourth aspect of the present application, step (1) may prepare three, four, five, seven, or even more matrix glass powders with different transmittance and/or color, each matrix glass powder with different transmittance and/or color after dense-sintering. As used herein, the term "matrix glass powder with different transmittance and/or color" means that the matrix glass powder exhibits different transmittance and/or color after dense-sintering. Similarly, the pre-sintered ceramic of "different transmittance and/or color" means that the transmittance and/or color of the pre-sintered ceramic is different after the pre-sintered ceramic is subjected to dense-sintering.

Since the pre-sintered ceramic block contains a large amount of lithium disilicate crystal phase after dense-sintering, the pre-sintered ceramic block after dense-sintering is also referred to as a lithium disilicate glass ceramic herein.

In some embodiments of the fourth aspect of the present application, in step (1), at least two matrix glass powders with different transmittance can be prepared for preparing pre-sintered ceramic blocks that show gradual transmittance after dense-sintering; in some embodiments, in step (1), at least two matrix glass powders with different color can be prepared for preparing pre-sintered ceramic blocks that show gradual color after dense-sintering; in other embodiments, in step (1), at least two matrix glass powders with different transmittance and color can be prepared for preparing pre-sintered ceramic blocks that show gradual transmittance and color after dense-sintering.

In some embodiments of the fourth aspect of the present application, in step (2), after one matrix glass powder is loaded into a mould and the upper surface of the powder is flattened to be flat, another matrix glass powder is loaded until all the powders are loaded into a mould, and then pressing molding is carried out.

The pre-sintered ceramic block prepared by the method provided in the fourth aspect of the present application comprises at least two layers; when the pre-sintered ceramic block is subjected to dense-sintering, the obtained product can show multi-layer gradual transmittance and/or color.

In the present application, the matrix glass powder with different transmittance and/or color can be prepared by adjusting the amount of each component; for example, matrix glass powders with different color can be prepared by adjusting the types and amounts of colorants; although the content of the components in the matrix glass powders with different transmittance and/or color, the components of each matrix glass powder and the amount thereof still satisfy the ranges of the components and the amount thereof of the pre-sintered ceramic block described above.

In some embodiments of the fourth aspect of the present application, the preparation of each matrix glass powder may be achieved according to the steps of preparing the matrix glass powder of the second aspect described above.

In some embodiments of the first and third aspects of the present application, the pre-sintered ceramic block for a dental restoration comprises the following components:

SiO$_2$ 55-80% wt
Li$_2$O: 12-25% wt
ZrO$_2$ 0-8% wt
Al$_2$O$_3$: 0.5-6% wt
La$_2$O$_3$: 0-5% wt
ZnO: 0-8% wt
K$_2$O: 0.1-9% wt
GeO$_2$: 0.1-6% wt
Nucleating agent: 0-8% wt
Colorant: 0-8% wt,
Other additives: 0-10% wt.

In some embodiments of the first and third aspects of the present application, the pre-sintered ceramic block for a dental restoration comprises the following components:

SiO$_2$ 60-80% wt
Li$_2$O: 13-17% wt
ZrO$_2$ 0-6% wt
Al$_2$O$_3$: 0.5-5% wt
La$_2$O$_3$: 0-4.5% wt
ZnO: 0-7% wt
K$_2$O: 0.1-7% wt
GeO$_2$: 0.3-5% wt
Nucleating agent: 0.5-8% wt
Colorant: 0-6% wt
Other additives: 0-4% wt.

In some embodiments of the first and third aspects of the present application, the pre-sintered ceramic block for a dental restoration comprises the following components:

SiO$_2$ 64-75% wt
Li$_2$O: 13-17% wt
ZrO$_2$ 0-4% wt
Al$_2$O$_3$: 0.5-4% wt
La$_2$O$_3$: 0-4% wt
ZnO: 0.1-5% wt
K$_2$O: 0.1-4.5% wt
GeO$_2$: 0.5-4% wt
Nucleating agent: 0.5-5% wt
Colorant: 0.1-5% wt
Other additives: 0-4% wt.

According to the pre-sintered ceramic block for a dental restoration provided in the present application, the addition of GeO$_2$ in the components of the pre-sintered ceramic block can effectively reduce the viscosity in the melting process of matrix glass, decrease the generation of bubbles in the melting process, reduce the possibility of pores in the pre-sintered ceramic block, improve the refractive index of the dense-sintered ceramic block, and improve the optical performance. In addition, the addition of the GeO$_2$ can improve the density of the dense-sintered ceramic block, thereby improving the strength thereof.

According to the pre-sintered ceramic block for a dental restoration provided by the present application, the addition of colorant is mainly used to color the densely sintered ceramic block to match with natural teeth of a patient. In a particular implementation, the colorant may be a glass colorant or a ceramic colorant.

As used herein, the glass colorant refer to the colorants used in glass and glass articles; including, but not limited to, oxides of transition metals, rare earth elements, etc.; the glass colorants can be derived directly from oxides of transition metals, rare earth elements, etc., or derived from salts that produce the glass colorant oxides described above after high temperature treatment, including, but not limited to, chlorides, etc.

As used herein, the ceramic colorant refer to the colorant used in ceramics and ceramic articles, including, but not limited to, zirconium iron red, zirconium cerium praseodymium yellow, nickel black, etc. The ceramic colorant such as zirconium iron red, zirconium cerium praseodymium yellow, and nickel black are commercially available.

The pre-sintered ceramic block for a dental restoration provided by the present application can be added with other additives in the components, and the other additives can be one of or a combination of at least two of B$_2$O$_3$, F, Na$_2$O, BaO, SrO, CaO, and MgO; the addition of B$_2$O$_3$ can reduce the viscosity of the matrix molten glass and the microcrystalline glass phase in the dense-sintering process and promote liquid phase sintering; F can convert surface crystallization of the lithium disilicate glass ceramic into integral crystallization; Na$_2$O can reduce the high temperature viscosity of the matrix molten glass; BaO can increase the surface brightness of the matrix glass, thereby increasing the surface brightness of the glass phase in the glass ceramic. SrO can be used as a fluxing agent when the matrix molten glass is prepared, which may reduce the viscosity of the molten glass, meanwhile reduce the viscosity of the microcrystalline glass during the dense-sintering process, and increase the refractive index of the glass phase in the glass ceramics. CaO also has the effect of reducing the high temperature viscosity of the molten glass.

The pre-sintered ceramic block provided by the present application is substantially opaque and not translucent to visible light; while the glass containing the same composition are generally transparent, the glass ceramics containing the same composition (also known as microcrystalline glass) are generally translucent; it can be seen therefrom that the pre-sintered ceramic block provided by the present application is different from glass or glass ceramic containing the same component in microstructure.

Herein, "opaque" has its general meaning; in particular embodiments of the present application, the opacity characteristics of a product, such as a pre-sintered ceramic block, are visually observed.

Herein, "transmittance" can be characterized by the transmittance of visible light, for example, the higher the transmittance of visible light, the better the transmittance; the lower the transmittance of visible light, the worse the transmittance; the gradual transmittance is understood the gradual visible light transmittance.

In some embodiments of the second and fourth aspects of the present application, the nucleating agent may be derived directly from oxides of P$_2$O$_5$, TiO$_2$, V$_2$O$_5$, Cr$_2$O$_3$, Fe$_2$O$_3$, or derived from salts that produces oxides of the nucleating agent described above after high temperature treatment, including, but not limited to, carbonates, chlorides, etc.

In some embodiments of the second and fourth aspects of the present application, the colorant contained in the matrix glass powder is a glass colorant or a ceramic colorant; preferably, the glass colorant is oxides of at least one of vanadium, chromium, manganese, iron, cobalt, nickel, copper, cerium, praseodymium, neodymium, samarium, promethium, terbium, dysprosium, holmium, erbium, thulium, ytterbium, samarium, and europium; the ceramic colorant is one of or a combination of at least two of zirconium iron red, zirconium cerium praseodymium yellow, and nickel black. More specifically, the glass colorant oxides described above can be derived directly from oxides of vanadium, chromium, manganese, iron, cobalt, nickel, copper, cerium, praseodymium, neodymium, samarium, promethium, terbium, dysprosium, holmium, erbium, thulium, ytterbium, samarium, europium, etc., and can also be derived from salts that produce the glass colorant oxides described above after high temperature treatment, including, but not limited to, chlorides, etc.

In some embodiments of the second and fourth aspects of the present application, the pressing molding may be dry pressing molding or isostatic pressing molding, and the pressure used in the pressing molding may be 50-300 MPa.

In the preparation method provided in the second and fourth aspects of the present application, the sintering temperature during pre-sintering is 530-590° C., and the inventors of the present application have unexpectedly found that within this temperature range, the prepared pre-sintered ceramic block contains silica as a main crystal phase; particularly, when the sintering temperature during pre-sintering is 530-560° C., the prepared pre-sintered ceramic block substantially does not contain a lithium metasilicate crystal phase; when the sintering temperature during pre-sintering is 570-590° C., in the prepared pre-sintered ceramic block contains a small amount of lithium metasilicate crystal phase. In a particular implementation, the sintering temperature during pre-sintering can be any value in a range of 530-590° C., such as 540° C., 550° C., 560° C., 570° C., etc.

The inventors have further found that if the pre-sintering temperature continues to be enhanced, when the pre-sintering temperature is higher than 590° C., for example, up to 600° C., the lithium metasilicate crystal phase in the powder will gradually become the main crystal phase.

In some embodiments of the preparation methods provided in the second and fourth aspects of the present application, the holding time for pre-sintering is 20-240 min, preferably 30-120 min, more preferably 60-120 min.

In some embodiments of the second and fourth aspects of the present application, pre-sintering and dense-sintering may be performed in a sintering furnace, which may provide a vacuum atmosphere; in a particular implementation, the vacuum condition may be 100-5000 Pa, preferably 1000-3000 Pa, in absolute pressure. The inventors of the present application have found that when a vacuum degree is 100-5000 Pa, especially in a range of 1000-3000 Pa, the better the denseness of the resultant lithium disilicate glass ceramics, the better the transmittance.

According to a fifth aspect of the present application, there is provided a method for preparing a ceramic block for a dental restoration, comprising the steps of:

preparing the pre-sintered ceramic block of the first aspect or the second aspect; and dense-sintering the pre-sintered ceramic block under a vacuum condition, wherein a temperature during dense-sintering is 800-1100° C.

according to a sixth aspect of the present application, there is provided a method for preparing a dental restoration, comprising the steps of:

preparing the pre-sintered ceramic block of the first aspect or the second aspect;

processing the pre-sintered ceramic block into a dental restoration shape to obtain a restoration body; and dense-sintering the restoration body under a vacuum condition to obtain a dental restoration; wherein a temperature during dense-sintering is 800-1100° C.

Through dense-sintering, the pre-sintered ceramic block can be further densified; in the dense-sintering process, the crystal amount in the ceramic block increases, the crystal grows, a large amount of lithium disilicate is precipitined, and a lithium disilicate glass ceramic or a lithium disilicate glass ceramic restoration is obtained, which takes lithium disilicate as a main crystal phase, has a strength of more than 200 MPa, and other excellent properties of which meet dental restoration requirements.

In some embodiments of the fifth and sixth aspects of the present application, the holding time for dense-sintering may be 1-60 min, preferably 1-40 min.

In some embodiments of the sixth aspect of the present application, the pre-sintered ceramic may be processed by a CAD/CAM technique, more specifically, by dry machining or wet machining.

In some embodiments of the sixth aspect of the present application, the pre-sintered ceramic may be processed by a CAD/CAM technique, more specifically, by dry machining or wet machining.

As used herein, the term dry machining, also referred to as dry processing, has its general meaning in the art and generally refers to a machining process in which cutting is performed without the use of a cutting fluid.

As used herein, the term wet machining, also referred to as wet processing, has its general meaning in the art and generally refers to a machining process in which cutting is performed using a cutting fluid; in the machining process, cutting fluid is sprayed on the ceramic block and the bur to reduce a large amount of heat generated in the machining process.

Compared with wet machining, the dry machining has lower machining cost and is easier to popularize due to the fact that expensive consumables such as cutting fluid and filter elements are not needed.

In some embodiments of the sixth aspect of the present application, the dental restoration may also be glazed and/or porcelain-finished after dense-sintering.

In some embodiments of the sixth aspect of the present application, the dental restoration may also be glazed and/or porcelain-finished after dense-sintering.

As used herein, "glazing" has its general meaning in the art and refers to the uniform application of a layer of colored or transparent glaze to the surface of a ceramic restoration, followed by sintering in a porcelain furnace to form a thin layer of oxide on the surface of the restoration. Glazing can seal the possible micropores and cracks on the surface of ceramic restoration and restore smooth surface morphology.

In this context, "porcelain-finishing" has the general meaning in the art, and means that porcelain powder with different functions and color is piled on the surface of a ceramic restoration, and then the restoration is placed in a porcelain furnace for sintering, so that the shape of the restoration is more visual and personalized, and the color is more vivid.

The pre-sintered ceramic block provided by the present application has a low pre-sintering temperature, contains a silica main crystal phase, but does not contain or contains a small amount of lithium metasilicate crystal phase. The pre-sintered ceramic block has a low hardness, with a Vickers hardness of 0.5-3 GPa, which is significantly lower than that of the ceramic block containing a lithium metasilicate crystal phase, and same is suitable for dry machining and also wet machining when being machined into a dental restoration.

BRIEF DESCRIPTION OF THE DRAWINGS

To describe the technical solutions in the examples of the present application and the prior art more clearly, the following briefly describes the drawings required for the examples and the prior art. Obviously, the drawings in the following description show some examples of the present application, and for those skilled in the art, other drawings can be obtained from these drawings without creative work.

DETAILED DESCRIPTION OF THE INVENTION

Figure 1:
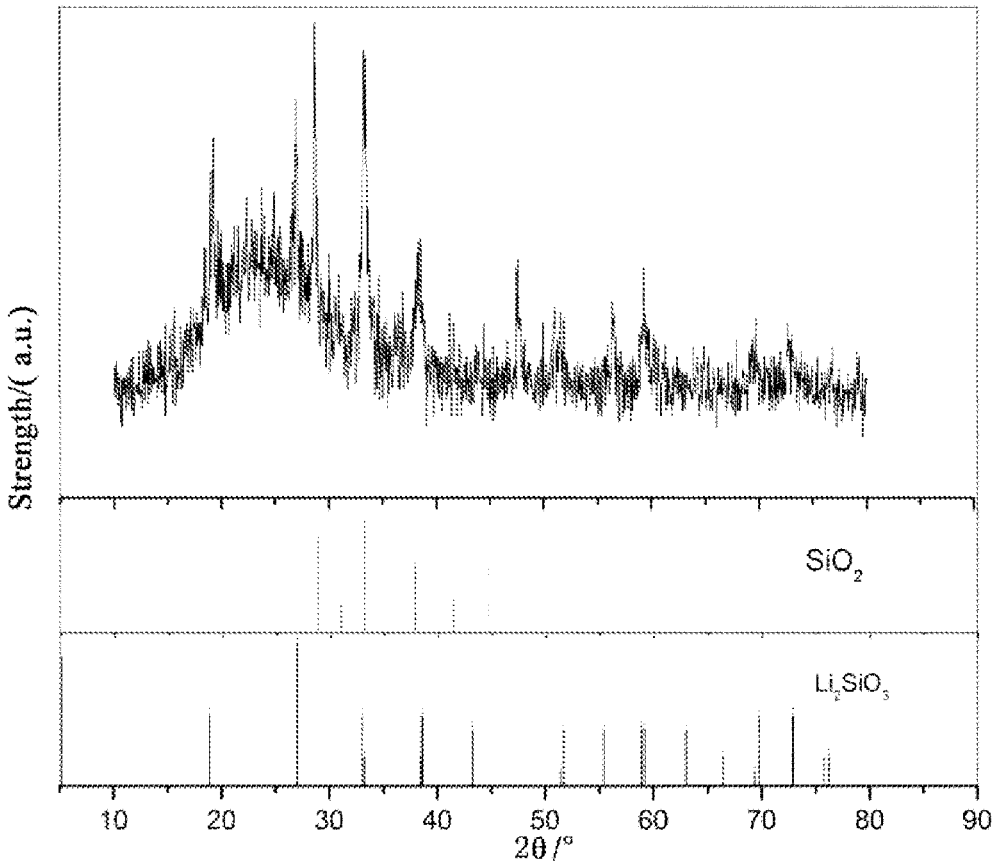
FIG. 1 is an XRD pattern of a pre-sintered ceramic block prepared in Example 2.

To make the objectives, technical solutions, and advantages of this application more comprehensible, the following describes this application in detail with reference to embodiments and drawings. Obviously, the described embodiments are merely some but not all of the embodiments of this application. All other embodiments obtained by those skilled in the art based on the embodiments of this application without creative efforts shall fall within the protection scope of this application.

PREPARATIVE EXAMPLES OF PRE-SINTERED CERAMIC BLOCKS AND DENTAL RESTORATION

Example 1

The matrix glass powder comprises the following components and amounts:

$SiO_2$: 67.1% wt
$Li_2O$: 14.7% wt
$ZrO_2$: 1.7% wt
$Al_2O_3$: 1.2% wt
$K_2O$: 4.2% wt
$P_2O_5$: 3.3% wt
$ZnO$: 4.2% wt
$CeO_2$: 0.9% wt
$GeO_2$: 0.65% wt
$MgO$: 0.3% wt
$La_2O_3$: 0.9% wt
$B_2O_3$: 0.3% wt
$V_2O_5$: 0.25% wt
$Er_2O_3$: 0.1%
$Tb_4O_7$: 0.2% wt
$MnO_2$: 0.08%

According to the components and the amounts of the matrix glass powder, the matrix raw materials such as oxides, carbonate compounds, and phosphates corresponding to all the components were ground and mixed uniformly, the mixed matrix raw materials were placed into a platinum crucible that was put into a furnace, heating to 1550° C., holding for 1 h, and clarifying and homogenizing to obtain a matrix molten glass; water-quenching was carried out on the prepared matrix molten glass to obtain glass fragments, and the glass fragments were dried for 1 h at 120° C.; and the dried glass fragments were ground to an average particle size of 5-30 μm to obtain matrix glass powders.

The matrix glass powders were loaded into a mould, uniaxial dry pressing molding was carried out under a molding pressure of 75 MPa, and then a matrix glass body with the weight of about 9-10 g was obtained.

The matrix glass body was sintered in a vacuum furnace under a vacuum atmosphere at 550° C. for 60 min, with a pressure (absolute pressure) in the vacuum furnace of 3000 Pa, to obtain a pre-sintered ceramic block;

The pre-sintered ceramic block was subjected to wet machining using CAD/CAM machining equipment (CEREC inLab MC XL, SIRONA) to obtain a restoration body.

The restoration body was subjected to dense-sintering in a sintering furnace under a vacuum atmosphere at 875° C. for 15 min, with a pressure (absolute pressure) in the vacuum furnace of 3000 Pa, to obtain a lithium disilicate glass ceramic restoration.

Example 2

According to the components and amounts of the monochromatic matrix glass powder 1 in Table 1, the matrix raw materials such as oxides, carbonate compounds, and phosphates corresponding to other components except for colorants ($V_2O_5$, $Er_2O_3$, $MnO_2$) were ground and mixed uniformly, the mixed raw materials were placed into a platinum crucible that was put into a furnace, heating to 1550° C., holding for 1 h, and clarifying and homogenizing to obtain a matrix molten glass; water-quenching was carried out on the prepared matrix molten glass to obtain glass fragments, and the glass fragments were dried for 1 h at 120° C.; and the dried glass fragments were ground to an average particle size of 5-30 μm, followed by adding the colorants and mixing uniformly; to obtain matrix glass powder 1.

In the same way, monochromatic matrix glass powder 2 and monochromatic matrix glass powder 3 were prepared. They are mixed uniformly according to mass ratio of monochromatic matrix glass powder 1:monochromatic matrix glass powder 2:monochromatic matrix glass powder 3=4:3: 2, to obtain a matrix glass powder. The matrix glass powders were loaded into a mould, uniaxial dry pressing molding was carried out under a molding pressure of 75 MPa, and then a matrix glass body with the weight of about 9-10 g was obtained.

The matrix glass body was sintered in a vacuum furnace under a vacuum atmosphere at 570° C. for 60 min, with a pressure (absolute pressure) in the vacuum furnace of 3000 Pa, to obtain a pre-sintered ceramic block; the pre-sintered ceramic block was subjected to XRD detection, the result was shown in FIG. 1, and it can be seen from FIG. 1 that the pre-sintered ceramic block prepared in this example contains a silica main crystal phase and a lithium metasilicate secondary crystal phase.

The pre-sintered ceramic block was subjected to dry machining by using CAD/CAM machining equipment (Roland DWX 51D) to obtain a restoration body, the processed restoration was complete, and there were no problems with incomplete edges, incomplete processing, and damage to the ceramic blocks.

The restoration body was subjected to dense-sintering in a sintering furnace under a vacuum atmosphere at 930° C.

for 10 min, with a pressure (absolute pressure) in the vacuum furnace of 3000 Pa, to obtain a lithium disilicate ceramic restoration.

TABLE 1

| Compo-nent | Monochromatic matrix glass powder 1 | Monochromatic matrix glass powder 2 | Monochromatic matrix glass powder 3 |
|---|---|---|---|
| $SiO_2$ | 69.60% | 69.67% | 69.67% |
| $Li_2O$ | 14.42% | 14.44% | 14.44% |
| $ZrO_2$ | 1.50% | 1.50% | 1.50% |
| $Al_2O_3$ | 1.16% | 1.26% | 1.26% |
| $K_2O$ | 3.58% | 3.58% | 3.58% |
| $P_2O_5$ | 4.00% | 4.00% | 4.00% |
| ZnO | 2.44% | 2.45% | 2.45% |
| $CeO_2$ | 1.15% | 1.15% | 1.15% |
| $GeO_2$ | 0.85% | 0.85% | 0.85% |
| MgO | 0.30% | 0.30% | 0.30% |
| La2O3 | 0.60% | 0.60% | 0.60% |
| $V_2O_5$ | — | 0.2% | — |
| $ErO_2$ | 0.3% | — | — |
| $MnO_2$ | — | — | 0.2% |

Example 3

According to the components and the amounts of the matrix glass powder 1 in Table 2, the matrix raw materials such as oxides, carbonate compounds, and phosphates corresponding to all the components were ground and mixed uniformly, the mixed raw materials were placed into a platinum crucible that was put into a furnace, heating to 1550° C., holding for 1 h, and clarifying and homogenizing to obtain a matrix molten glass; water-quenching was carried out on the prepared matrix molten glass to obtain glass fragments, and the glass fragments were dried for 1 h at 120° C.; and the dried glass fragments were ground to an average particle size of 5-30 μm to obtain matrix glass powder 1, respectively.

In the same way, monochromatic matrix glass powder 2 and monochromatic matrix glass powder 3 were prepared. They are mixed uniformly according to a ratio of mono-chromatic matrix glass powder 1:monochromatic matrix glass powder 2:monochromatic matrix glass powder 3=4:3:2 to obtain a matrix glass powder.

The pre-sintered ceramic block was obtained by molding and pre-sintering according to the method of Example 2; and the lithium disilicate ceramic restoration was obtained by wet machining and dense-sintering on the pre-sintered ceramic block according to the method of Example 1.

TABLE 2

| Compo-nent | Monochromatic matrix glass powder 1 | Monochromatic matrix glass powder 2 | Monochromatic matrix glass powder 3 |
|---|---|---|---|
| $SiO_2$ | 69.81% | 69.81% | 69.81% |
| $Li_2O$ | 14.47% | 14.47% | 14.47% |
| $ZrO_2$ | 1.5% | 1.5% | 1.5% |
| $Al_2O_3$ | 1.26% | 1.26% | 1.26% |
| $K_2O$ | 3.60% | 3.60% | 3.60% |
| $P_2O_5$ | 4.01% | 4.01% | 4.01% |
| ZnO | 2.35% | 2.4% | 2.4% |
| $CeO_2$ | 1.05% | 1.1% | 1.15% |
| $GeO_2$ | 0.85% | 0.85% | 0.85% |
| MgO | 0.3% | 0.3% | 0.3% |
| La2O3 | 0.5% | 0.5% | 0.5% |
| $V_2O_5$ | — | 0.2% | — |
| $ErO_2$ | 0.3% | — | — |
| $MnO_2$ | — | — | 0.15% |

Example 4

The matrix glass powder comprises the following components and contents:

$SiO_2$: 70.42% wt
$Li_2O$: 14.97% wt
$ZrO_2$: 0.74% wt
$Al_2O_3$: 1.01% wt
$K_2O$: 2.58% wt
$P_2O_5$: 3.6% wt
ZnO: 3.9% wt
$CeO_2$: 0.65% wt
$GeO_2$: 1.03% wt
MgO: 0.2% wt
$La_2O_3$: 0.5% wt
$V_2O_5$: 0.15% wt
$Er_2O_3$: 0.2% wt
$MnO_2$: 0.05% wt

According to the components and amounts of the matrix glass powder, the matrix raw materials such as oxides, carbonate compounds, and phosphates corresponding to other components except for colorants ($V_2O_5$, $Er_2O_3$, and $MnO_2$) were ground and mixed uniformly, the mixed matrix raw materials were placed into a platinum crucible that was put into a furnace, heating to 1550° C., holding for 1 h, and clarifying and homogenizing to obtain a matrix molten glass; water-quenching was carried out on the prepared matrix molten glass to obtain glass fragments, and the glass fragments were dried for 1 h at 120° C.; and the dried glass fragments were ground to an average particle size of 5-30 μm, followed by adding the colorants and mixing uniformly; to obtain a matrix glass powder.

The matrix glass powders were loaded into a mould, uniaxial dry pressing molding was carried out under a molding pressure of 75 MPa, and then a matrix glass body with a weight of about 9-10 g was obtained.

Figure 2:
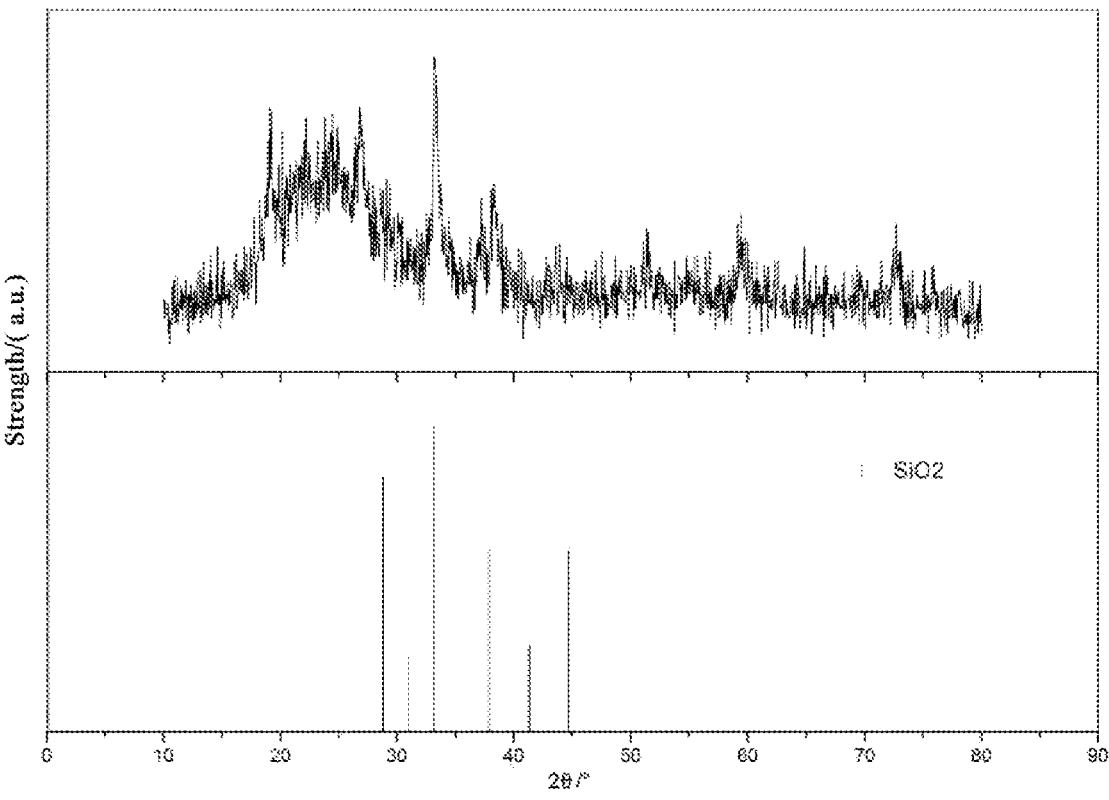
FIG. 2 is an XRD pattern of a pre-sintered ceramic block prepared in Example 4.

The matrix glass body was sintered in a vacuum furnace under a vacuum atmosphere at 540° C. for 120 min, with a pressure (absolute pressure) in the vacuum furnace of 3000 Pa, to obtain a pre-sintered ceramic block; the pre-sintered ceramic block was subjected to XRD detection, the result was shown in FIG. 2, it can be seen that the diffraction peaks of the sample treated at this temperature correspond to those of $SiO_2$ standard PDF card, and the pre-sintered ceramic block prepared in this example contains a silica crystal phase but does not contain a lithium metasilicate crystal phase.

The pre-sintered ceramic block was subjected to dry machining using CAD/CAM machining equipment (Roland DWX-51D) to obtain a restoration body.

The restoration body was subjected to dense-sintering in a sintering furnace under a vacuum atmosphere at 880° C. for 8 min, with a pressure (absolute pressure) in the vacuum furnace of 3000 Pa, to obtain a lithium disilicate ceramic restoration.

Examples 5-10

The matrix glass powders of Examples 5-10 were pre-pared and molded according to the method of Example 1 and the components in Table 3.

The matrix glass body of Examples 5-10 was pre-sintered in a vacuum furnace under a vacuum atmosphere to obtain a pre-sintered ceramic block, wherein the sintering tempera-ture and the holding time were shown in Table 3, and the pressure (absolute pressure) in the vacuum furnace was 3000 Pa; the pre-sintered ceramic blocks of each example were machined using the corresponding CAD/CAM machining equipment in Table 3 to obtain a restoration body. The restoration body of Examples 5-10 was subjected to dense-sintering in a sintering furnace under a vacuum atmosphere to obtain a lithium disilicate glass ceramic restoration, wherein the sintering temperature and holding time were shown in Table 3, and the pressure (absolute pressure) in the vacuum furnace was 3000 Pa.

TABLE 4-continued

| | Example 11 | Example 12 | Example 13 | Example 14 | Example 15 |
|---|---|---|---|---|---|
| $GeO_2$ | 0.5% | 0.50% | 0.30% | 0.50% | 0.10% |
| $La_2O_3$ | — | — | — | 0.45% | — |

TABLE 3

| | Example 5 | Example 6 | Example 7 | Example 8 | Example 9 | Example 10 |
|---|---|---|---|---|---|---|
| $SiO_2$ | 64.02% | 66.5% | 66.8% | 70.1% | 68.62% | 71.17% |
| $Li_2O$ | 13.06% | 14.05% | 14.2% | 14.8% | 14.9% | 15.23% |
| $ZrO_2$ | 1.3% | 3.92% | 0.5% | — | 1.58% | — |
| $Al_2O_3$ | 2.05% | 1.15% | 3.97% | 2.15% | 2.04% | 0.5% |
| $K_2O$ | 4.05% | 3.48% | 3.65% | 3.75% | 0.5% | 2.75% |
| $P_2O_5$ | 4.02% | 3.85% | 3.25% | 3.65% | 4.95% | 2.75% |
| $ZnO$ | 3.9% | 2.6% | 1.6% | 2.3% | 2.02% | 0.1% |
| $CeO_2$ | 1.75% | 1.55% | 0.5% | 1.1% | 1.31% | 2.5% |
| $GeO_2$ | 3.98% | 1.4% | 1.0% | 0.5% | 2.06% | 2.0% |
| $La_2O_3$ | 1.2% | 0.8% | 3.98% | 0.73% | 0.82% | 1.7% |
| $MgO$ | — | — | — | — | 0.2% | 0.18% |
| $B_2O_3$ | — | — | — | — | — | 0.5% |
| $V_2O_5$ | 0.2% | 0.15% | 0.2% | 0.27% | 0.32% | 0.20% |
| $ErO_2$ | 0.17% | 0.25% | 0.15% | 0.15% | 0.25% | 0.15% |
| $Tb_4O_7$ | 0.3% | 0.3% | 0.2% | 0.4% | 0.43% | 0.27% |
| Pre-sintering temperature/ holding time | 550° C./ 60 min | 550° C./ 60 min | 540° C./ 60 min | 560° C./ 60 min | 560° C./ 60 min | 530° C./ 60 min |
| Dense-sintering temperature/ holding time | 875° C./ 10 min | 880° C./ 5 min | 900° C./ 3 min | 910° C./ 5 min | 875° C./ 10 min | 930° C./ 1 min |
| Machining equipment | Roland DWX-51D | Roland DWX-51D | CEREC inLab MC XL | CEREC inLab MC XL | Roland DWX-51D | Roland DWX-51D |

Examples 11-15

The matrix glass powders of Examples 11-15 were prepared and molded according to the method of Example 4 and the components in Table 4.

The matrix glass body of Examples 11-15 was pre-sintered in a vacuum furnace under a vacuum atmosphere to obtain a pre-sintered ceramic block, wherein the sintering temperature and the holding time were shown in Table 4, and the pressure (absolute pressure) in the vacuum furnace was 3000 Pa; the pre-sintered ceramic blocks of each example were machined using the corresponding CAD/CAM machining equipment in Table 3 to obtain a restoration body.

The restoration body of Examples 11-15 was subjected to dense-sintering in a sintering furnace under a vacuum atmosphere to obtain a lithium disilicate glass ceramic restoration, wherein the sintering temperature and holding time were shown in Table 4, and the pressure (absolute pressure) in the vacuum furnace was 3000 Pa.

TABLE 4-continued

| | Example 11 | Example 12 | Example 13 | Example 14 | Example 15 |
|---|---|---|---|---|---|
| $MgO$ | 0.3% | 0.60% | 0.20% | 0.20% | |
| $B2O3$ | — | 0.79% | 0.48% | 0.40% | 0.36% |
| $V_2O_5$ | — | 0.15% | 0.20% | 0.18% | 0.1% |
| $ErO_2$ | — | 0.15% | 0.44% | 0.3% | 0.07% |
| $Tb_4O_7$ | — | 0.38% | 0.1% | 0.30% | 0.35% |
| Pre-sintering temperature/ holding time | 550° C./ 60 min | 540° C./ 60 min | 550° C./ 60 min | 560° C./ 60 min | 545° C./ 60 min |
| Dense-sintering temperature/ holding time | 875° C./ 15 min | 850° C./ 15 min | 890° C./ 10 min | 875° C./ 15 min | 875° C./ 15 min |
| Machining equipment | CEREC inLab MC XL | Roland DWX-51D | Roland DWX-51D | CEREC inLab MC XL | Roland DWX-51D |

Example 16

According to the components and amounts of the matrix glass powder 1 in Table 5, the matrix raw materials such as oxides, carbonate compounds, and phosphates corresponding to other components except for colorants ($V_2O_5$, $ErO_2$, $Tb_4O_7$) were ground and mixed uniformly, the mixed matrix raw materials were placed into a platinum crucible that was put into a sintering furnace, heating to 1550° C., holding for 1 h, and clarifying and homogenizing to obtain a matrix molten glass; water-quenching was carried out on the prepared matrix molten glass to obtain glass fragments, and the glass fragments were dried for 1 h at 120° C.; and the dried

TABLE 4

| | Example 11 | Example 12 | Example 13 | Example 14 | Example 15 |
|---|---|---|---|---|---|
| $SiO_2$ | 70.9% | 69.14% | 71.28% | 72.05% | 74.59% |
| $Li_2O$ | 14.8% | 14.71% | 16.82% | 15.60% | 13.44% |
| $ZrO_2$ | — | 0.79% | 0.50% | — | — |
| $Al_2O_3$ | 1.0% | 1.09% | 1.09% | 0.40% | 0.99% |
| $K_2O$ | 2.95% | 4.45% | 3.77% | 3.91% | 4.08% |
| $P_2O_5$ | 3.9% | 3.26% | 3.97% | 0.50% | 3.33% |
| $ZnO$ | 3.5% | 3.08% | 0.25% | 4.91% | 2.59% |
| $CeO_2$ | 2.15% | 0.91% | 0.60% | 0.30% | — | glass fragments were ground to an average particle size of 5-30 μm, followed by adding the colorants and mixing uniformly; to obtain matrix glass powder 1. In the same way, the matrix glass powder 2 and the matrix glass powder 3 were prepared. The obtained three matrix glass powders had the same transmittance but different color.

The matrix glass powder 1 was added into a dry pressing mould, the upper surface of the powder was flattened to be flat, then the matrix glass powder 2 was added, the upper surface of the powder was flattened to be flat, and then the matrix glass powder 3 was added, wherein the matrix glass powder 1 has a thickness of 5.5 mm, the matrix glass powder 2 has a thickness of 5 mm, and the matrix glass powder 3 has a thickness of 5.5 mm; uniaxial dry pressing molding was carried out under a pressure of 50 MPa, and then a matrix glass body with a weight of about 9-10 g was obtained.

The matrix glass body was sintered in a vacuum furnace under a vacuum atmosphere at 555° C. for 60 min, with a pressure (absolute pressure) in the vacuum furnace of 3000 Pa, to obtain a pre-sintered ceramic block;

The pre-sintered ceramic block was subjected to wet machining using CAD/CAM machining equipment (CEREC inLab MC XL, SIRONASIRONA) to obtain a restoration body. The restoration body was subjected to dense-sintering in a sintering furnace under a vacuum atmosphere at 920° C. for 5 min, with a pressure (absolute pressure) in the vacuum furnace of 3000 Pa, to obtain a three-layer colored lithium disilicate ceramic restoration.

TABLE 5

| Component | Matrix glass powder 1 | Matrix glass powder 2 | Matrix glass powder 3 |
|---|---|---|---|
| $SiO_2$ | 68.96% | 68.965% | 68.96% |
| $Li_2O$ | 15.22% | 15.22% | 15.22% |
| $ZrO_2$ | 1.67% | 1.67% | 1.67% |
| $Al_2O_3$ | 1.00% | 1.00% | 1.00% |
| $K_2O$ | 3.68% | 3.68% | 3.68% |
| $P_2O_5$ | 3 63% | 3.63% | 3.63% |
| $ZnO$ | 2.69% | 2.69% | 2.69% |
| $CeO_2$ | 1.58% | 1.58% | 1.58% |
| $GeO_2$ | 0.77% | 0.77% | 0.77% |
| $La_2O_3$ | 0.30% | 0.30% | 0.30% |
| $V_2O_5$ | 0.11% | 0.09% | 0.07% |
| $ErO_2$ | 0.09% | 0.08% | 0.07% |
| $Tb_4O_7$ | 0.30% | 0.33% | 0.36% |

Example 17

According to the components and amounts of the matrix glass powder 1 in Table 6, the matrix raw materials such as oxides, carbonate compounds, and phosphates compound corresponding to other components except for colorants were ground and mixed uniformly, the mixed raw materials were placed into a platinum crucible that was put into a furnace, heating to 1550° C., holding for 1 h, and clarifying and homogenizing to obtain a matrix molten glass; water-quenching was carried out on the prepared matrix molten glass to obtain glass fragments, and the glass fragments were dried for 1 h at 120° C.; and the dried glass fragments were ground to an average particle size of 5-30 μm, followed by adding the colorants and mixing uniformly; to obtain matrix glass powder 1. In the same way, the matrix glass powder 2 and the matrix glass powder 3 were prepared. The obtained three matrix glass powders were different in transmittance and color.

The matrix glass powder 1 was added into a dry pressing mould, the upper surface of the powder was flattened to be flat, then the matrix glass powder 2 was added, the upper surface of the powder was flattened to be flat, and then the matrix glass powder 3 was added, wherein the matrix glass powder 1 has a thickness of 5.7 mm, the matrix glass powder 2 has a thickness of 4.9 mm, and the matrix glass powder 3 has a thickness of 5.4 mm; uniaxial dry pressing molding was carried out under a pressure of 50 MPa, and then a matrix glass body with a weight of about 9-10 g was obtained.

Figure 3:
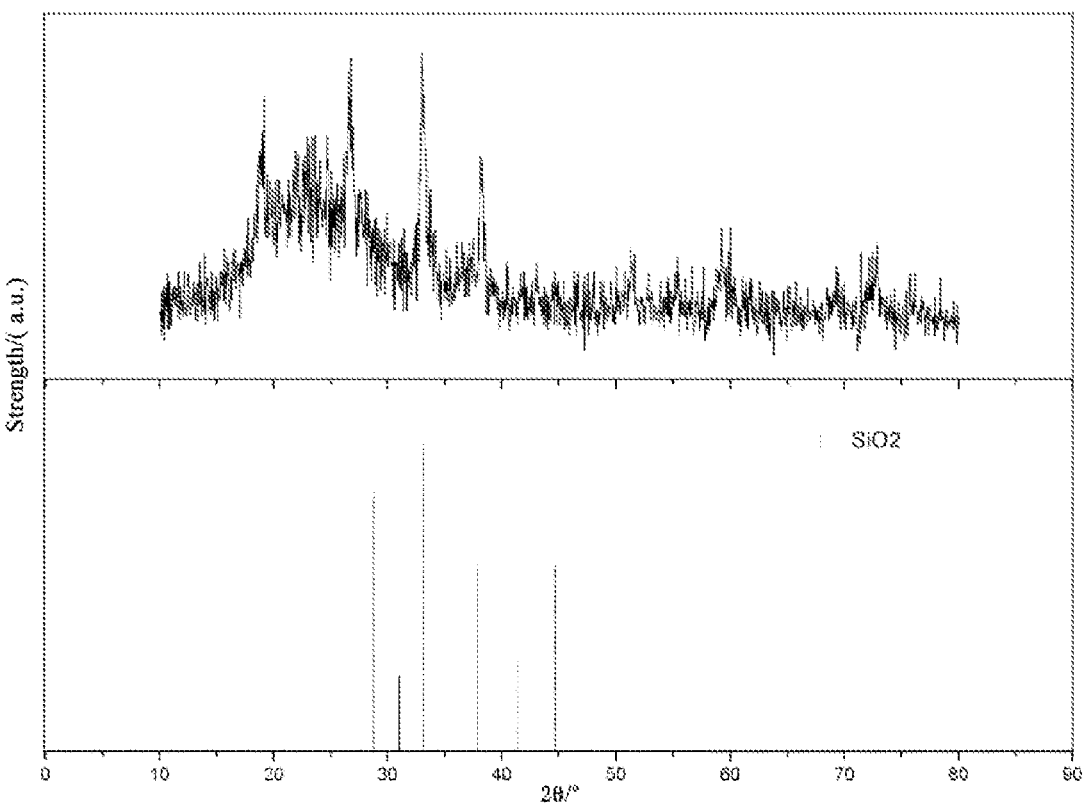
FIG. 3 is an XRD pattern of a pre-sintered ceramic block prepared in Example 17.

The matrix glass body was sintered in a vacuum furnace under a vacuum atmosphere at 560° C. for 120 min, with a pressure (absolute pressure) in the vacuum furnace of 3000 Pa, to obtain a pre-sintered ceramic block; the pre-sintered ceramic block was subjected to XRD detection, the result was shown in FIG. 3, the diffraction peaks of the sample treated at this temperature correspond to those of $SiO_2$ standard PDF card, and the pre-sintered ceramic block prepared in this example contains a silica crystal phase but does not contain a lithium metasilicate crystal phase.

The pre-sintered ceramic block was subjected to dry machining using CAD/CAM machining equipment (Roland DWX-51D) to obtain a restoration body.

The restoration body was subjected to dense-sintering in a sintering furnace under a vacuum atmosphere at 875° C. for 15 min, with a pressure (absolute pressure) in the vacuum furnace of 3000 Pa, to obtain a three-layered lithium disilicate glass ceramic restoration with gradual transmittance and color.

TABLE 6

| Component | Matrix glass powder 1 | Matrix glass powder 2 | Matrix glass powder 3 |
|---|---|---|---|
| $SiO_2$ | 68.96% | 69.41% | 69.94% |
| $Li_2O$ | 15.22% | 14.58% | 14.28% |
| $ZrO_2$ | 1.51% | 1.49% | 1.19% |
| $Al_2O_3$ | 1.00% | 1.24% | 1.00% |
| $K_2O$ | 3.73% | 3.18% | 3.78% |
| $P_2O_5$ | 3.63% | 3.88% | 4.00% |
| $ZnO$ | 1.69% | 3.00% | 2.89% |
| $CeO_2$ | 1.58% | 1.17% | 1.10% |
| $GeO_2$ | 0.77% | 0.75% | 0.62% |
| $La_2O_3$ | 0.40% | 0.70% | 0.70% |
| $V_2O_5$ | 0.11% | 0.09% | 0.07% |
| $ErO_2$ | 0.09% | 0.08% | 0.07% |
| $Tb_4O_7$ | 0.26% | 0.30% | 0.36% |
| $MnO_2$ | 0.04% | 0.03% | — |

Example 18

According to the components and amounts of the matrix glass powder 18-1 in Table 7, the matrix raw materials such as oxides, carbonate compounds, and phosphates corresponding to other components except for colorants were ground and mixed uniformly, the mixed raw materials were placed into a platinum crucible that was put into a furnace, heating to 1550° C., holding for 1 h, and clarifying and homogenizing to obtain a matrix molten glass; water-quenching was carried out on the prepared matrix molten glass to obtain glass fragments, and the glass fragments were dried for 1 h at 120° C.; and the dried glass fragments were ground to an average particle size of 5-30 μm, followed by adding the colorants and mixing uniformly; to obtain mono-chromatic matrix glass powder 18-1. In the same way, monochromatic matrix glass powder 18-2 and monochro-matic matrix glass powder 18-3 were prepared. They are mixed uniformly according to a ratio of monochromatic matrix glass powder 18-1: monochromatic matrix glass powder 18-2: monochromatic matrix glass powder 18-3=2:
4:3 to obtain matrix glass powder 18-L.

According to the components and amounts of each matrix glass powder in Table 8, monochromatic matrix glass powder 18-4, monochromatic matrix glass powder 18-5, and monochromatic matrix glass powder 18-6 were prepared respectively according to the preparation method of monochromatic matrix glass powder 18-1. They are mixed uniformly according to a ratio of monochromatic matrix glass powder 18-4: monochromatic matrix glass powder 18-5: the monochromatic matrix glass powder 18-6=2.5:3.5:3 to obtain matrix glass powder 18-M.

According to the components and amounts of each matrix glass powder in Table 9, monochromatic matrix glass powder 18-7, monochromatic matrix glass powder 18-8, and monochromatic matrix glass powder 18-9 were prepared respectively according to the preparation method of monochromatic matrix glass powder 18-1. They are mixed uniformly according to a ratio of monochromatic matrix glass powder 18-7: monochromatic matrix glass powder 18-8: the monochromatic matrix glass powder 18-9=2:3.5:3.5 to obtain matrix glass powder 18-H.

Some of matrix glass powder 18-L and some of matrix glass powder 18-M were mixed according to a mass ratio of 1:1.5 to obtain glass powder 18-LM;

Some of matrix glass powder 18-M and some of matrix glass powder 18-H were mixed according to a mass ratio of 1:2 to obtain glass powder 18-MH;

The matrix glass powder L was added into a dry pressing mould, the upper surface of the powder was flattened to be flat, then the matrix glass powder LM was added, the upper surface of the powder was flattened to be flat, and then the matrix glass powder M was added, the upper surface of the powder was flattened to be flat, then the matrix glass powder MH was added, the upper surface of the powder was flattened to be flat, then the matrix glass powder H was added, wherein the matrix glass powder L has a thickness of 4 mm, the matrix glass powder LM has a thickness of 3 mm, the matrix glass powder M has a thickness of 2.5 mm, the matrix glass powder MH has a thickness of 2.5 mm, and the matrix glass powder H has a thickness of 4 mm; uniaxial dry pressing molding was carried out under a pressure of 75 MPa, and then a matrix glass body with a weight of about 9-10 g was obtained.

The matrix glass body was sintered in a vacuum furnace under a vacuum atmosphere at 550° C. for 60 min, with a pressure (absolute pressure) in the vacuum furnace of 3000 Pa, to obtain a pre-sintered ceramic block;

The pre-sintered ceramic block was subjected to dry machining using CAD/CAM machining equipment (Roland DWX-51D) to obtain a restoration body.

The restoration body was subjected to dense-sintering in a sintering furnace under a vacuum atmosphere at 875° C. for 10 min, with a pressure (absolute pressure) in the vacuum furnace of 3000 Pa, to obtain a five-layered lithium disilicate glass ceramic restoration with gradual transmittance and color.

TABLE 7

| Compo-nent | Matrix glass powder 18-1 | Matrix glass powder 18-2 | Matrix glass powder 18-3 |
|---|---|---|---|
| $SiO_2$ | 69.06% | 69.06% | 69.06% |
| $Li_2O$ | 15.15% | 15.25% | 15.25% |
| $ZrO_2$ | 1.52% | 1.52% | 1.52% |
| $Al_2O_3$ | 1.01% | 1.01% | 1.01% |

TABLE 7-continued

| Compo-nent | Matrix glass powder 18-1 | Matrix glass powder 18-2 | Matrix glass powder 18-3 |
|---|---|---|---|
| $K_2O$ | 3.73% | 3.73% | 3.73% |
| $P_2O_5$ | 3.64% | 3.64% | 3.64% |
| ZnO | 2.69% | 2.69% | 2.69% |
| $CeO_2$ | 1.58% | 1.58% | 1.58% |
| $GeO_2$ | 0.77% | 0.77% | 0.77% |
| $La_2O_3$ | 0.40% | 0.40% | 0.40% |
| $V_2O_5$ | — | — | 0.3% |
| $ErO_2$ | — | 0.35% | — |
| $Tb_4O_7$ | 0.15% | — | 0.05% |
| $MnO_2$ | 0.20% | — | — |

TABLE 8

| Compo-nent | Matrix glass powder 18-4 | Matrix glass powder 18-5 | Matrix glass powder 18-6 |
|---|---|---|---|
| $SiO_2$ | 69.54% | 69.54% | 69.54% |
| $Li_2O$ | 14.61% | 14.61% | 14.61% |
| $ZrO_2$ | 1.50% | 1.50% | 1.50% |
| $Al_2O_3$ | 1.25% | 1.25% | 1.25% |
| $K_2O$ | 3.28% | 3.28% | 3.28% |
| $P_2O_5$ | 3.89% | 3.89% | 3.89% |
| ZnO | 3.01% | 3.01% | 3.01% |
| $CeO_2$ | 1.18% | 1.18% | 1.18% |
| $GeO_2$ | 0.75% | 0.75% | 0.75% |
| $La_2O_3$ | 0.70% | 0.70% | 0.70% |
| $V_2O_5$ | — | — | 0.24% |
| $ErO_2$ | — | 0.29% | — |
| $Tb_4O_7$ | 0.15% | — | 0.05% |
| $MnO_2$ | 0.14% | — | — |

TABLE 9

| Compo-nent | Matrix glass powder 18-7 | Matrix glass powder 18-8 | Matrix glass powder 18-9 |
|---|---|---|---|
| $SiO_2$ | 70.29% | 70.29% | 70.29% |
| $Li_2O$ | 14.35% | 14.35% | 14.35% |
| $ZrO_2$ | 1.2% | 1.2% | 1.2% |
| $Al_2O_3$ | 1.01% | 1.01% | 1.01% |
| $K_2O$ | 3.75% | 3.75% | 3.75% |
| $P_2O_5$ | 4.02% | 4.02% | 4.02% |
| ZnO | 2.85% | 2.85% | 2.85% |
| $CeO_2$ | 1.11% | 1.11% | 1.11% |
| $GeO_2$ | 0.62% | 0.62% | 0.62% |
| $La_2O_3$ | 0.7% | 0.7% | 0.7% |
| $V_2O_5$ | — | — | 0.1% |
| $ErO_2$ | — | 0.1% | — |
| $Tb_4O_7$ | 0.05% | — | — |
| $MnO_2$ | 0.05% | — | — |

In the above Tables 1-9, the percentages of each component are mass percentages. XRD detection conditions for Examples 1-18 were as follows: the samples were detected using X-ray diffraction (XRD) with a D8 Advance X-ray diffractometer obtained by Bruker, Karlsruhe, Germany, wherein a radiation source is Cu target, an applied voltage is 40.0 kV, an anode current is 40.0 mA, a slit width is 1.0 mm, and a scanning range is 10°-80°.

Performance Test

Vickers hardness and three-point bending strength of the pre-sintered ceramic blocks, and three-point bending strength and visible light transmittance of the pre-sintered ceramic blocks subjected to dense-sintering in Examples 1-18 were tested respectively, and the test results were shown in Table 10; wherein, (1) Vickers hardness was measured using a HVS-50 Vickers hardness tester according to the method described in ISO 14705:2016 and calculated according to the following formula:

$$HV = 0.001854 \frac{F}{d^2}$$

wherein:

HV—Vickers hardness, in GPa

F—Load on the pressure head (N)

d—Arithmetic average of two diagonal lines of indentation (mm)

(2) Three-point bending strength was measured according to the method described in ISO 14704:2016 and calculated according to the following formula:

$$\sigma_f = \frac{3Fa}{2bd^2}$$

wherein:

$\sigma_f$—Flexural strength, in MPa

F—Breaking load, in N a—Span, in mm b—Width of test sample, in mm d—Thickness of test sample, in mm (3) The visible light transmittance was measured according to the method described in ISO 9050: 2003, and the visible light transmittance was calculated according to the following formula:

$$\tau_v = \frac{\sum\limits_{\lambda=380\ nm}^{780\ nm} \tau(\lambda) D_\lambda V(\lambda) \Delta\lambda}{\sum\limits_{\lambda=380\ nm}^{780\ nm} D_\lambda V(\lambda) \Delta\lambda}$$

wherein:

$\tau_v$—Visible light transmittance of the sample, %;

$\tau(\lambda)$ —Visible spectral transmittance of the sample, %

$D_\lambda$—Relative spectral power distribution of standard illuminant $D_{65}$ $V(\lambda)$ —Photopic vision spectral luminous efficiency $\Delta\lambda$—Wavelength interval

TABLE 10

| | Vickers hardness (Gpa) | Strength of pre-sintered ceramic block (MPa) | Strength after dense-sintering (MPa) | Visible light transmittance |
|---|---|---|---|---|
| Example 1 | 1.84 | 41.17 | 354.04 | 45.23% |
| Example 2 | 2.09 | 63.39 | 310.72 | 54.56% |
| Example 3 | 2.12 | 55.93 | 330.29 | 55.49% |
| Example 4 | 1.71 | 40.03 | 373.47 | 46.68% |
| Example 5 | 1.65 | 40.70 | 340.79 | 57.01% |
| Example 6 | 1.76 | 51.43 | 342.34 | 47.12% |
| Example 7 | 1.56 | 37.66 | 353.1 | 45.90% |
| Example 8 | 1.99 | 49.22 | 377.52 | 45.95% |
| Example 9 | 1.92 | 55.38 | 360.6 | 44.27% |
| Example 10 | 1.39 | 36.89 | 339.05 | 41.05% |
| Example 11 | 1.87 | 39.63 | 397.75 | 55.98% |
| Example 12 | 1.60 | 40.60 | 355.32 | 43.44% |

TABLE 10-continued

| | Vickers hardness (Gpa) | Strength of pre-sintered ceramic block (MPa) | Strength after dense-sintering (MPa) | Visible light transmittance |
|---|---|---|---|---|
| Example 13 | 1.80 | 46.14 | 369.49 | 42.9% |
| Example 14 | 1.91 | 46.57 | 359.07 | 38.25% |
| Example 15 | 1.80 | 41.06 | 338.66 | 46.49% |
| Example 16 | 2.05 | 47.52 | 355.60 | 42.74% |
| Example 17 | 1.89 | 50.94 | 376.08 Mpa | 43.08%-47.92%-54.20% (gradual) |
| Example 18 | 1.72 | 47.90 | 344.83 Mpa | 43.11%-45.01%-47.39%-50.83%-54.44% (gradual) |

Note: the strength in the table refers to the three point bending strength

The foregoing descriptions are merely preferred embodiments of this application, but are not intended to limit this application. Any modification, equivalent replacement, or improvement made without departing from the spirit and principle of this application shall fall within the protection scope of this application.

The invention claimed is:

1. A pre-sintered ceramic block for a dental restoration, wherein the pre-sintered ceramic block comprises the following components:

$SiO_2$: 55-85% wt, $Li_2O$: 12-25% wt, $ZrO_2$: 0-10% wt, $Al_2O_3$: 0.3-8% wt, $La_2O_3$: 0-7% wt,

ZnO: 0-10% wt, $K_2O$: 0.1-10% wt, $GeO_2$: 0.1-7% wt, nucleating agent: 0-10% wt, colorant: 0-10% wt, and other additives: 0-15% wt;

wherein the nucleating agent is one of or a combination of at least two of $P_2O_5$, $TiO_2$, $V_2O_5$, $Cr_2O_3$, and $Fe_2O_3$; the other additives are one of or a combination of at least two of $B_2O_3$, F, $Na_2O$, BaO, SrO, CaO, and MgO; and wherein the pre-sintered ceramic block contains a silica main crystal phase, has a Vickers hardness of 0.5-3 GPa, and is opaque.

2. The pre-sintered ceramic block according to claim 1, wherein the pre-sintered ceramic block has a three-point bending strength of 10-110 MPa.

3. The pre-sintered ceramic block according to claim 1, wherein the pre-sintered ceramic block does not contain a lithium metasilicate crystal phase.

4. The pre-sintered ceramic block according to claim 1, wherein the colorant is a glass colorant or a ceramic colorant.

5. A method for preparing the pre-sintered ceramic block according to claim 1, comprising the steps of:

(1) preparing a matrix glass powder;

(2) putting the prepared matrix glass powder into a mould, and carrying out pressing molding to obtain a matrix glass body; and (3) pre-sintering the matrix glass body under a vacuum condition to obtain the pre-sintered ceramic block, wherein a sintering temperature during pre-sintering is 530-590° C.

6. The method for preparing the pre-sintered ceramic block according to claim 5, wherein the matrix glass powder comprises the following components:

SiO$_2$: 55-85% wt,
Li$_2$O: 12-25% wt,
ZrO$_2$: 0-10% wt,
Al$_2$O$_3$: 0.3-8% wt,
La$_2$O$_3$: 0-7% wt,
ZnO: 0-10% wt,
K$_2$O: 0.1-10% wt,
GeO$_2$: 0.1-7% wt,
nucleating agent: 0-10% wt,
colorant: 0-10% wt, and
other additives: 0-15% wt;
wherein the nucleating agent is one of or a combination of at least two of P$_2$O$_5$, TiO$_2$, V$_2$O$_5$, Cr$_2$O$_3$, and Fe$_2$O$_3$; the other additives are one of or a combination of at least two of B$_2$O$_3$, F, Na$_2$O, BaO, SrO, CaO, and MgO.

7. The method for preparing the pre-sintered ceramic block according to claim 5, wherein the sintering temperature during pre-sintering is 530-560° C.

8. The method for preparing the pre-sintered ceramic block according to claim 5, wherein a holding time for pre-sintering is 20-240 min.

9. A pre-sintered ceramic block for a dental restoration, wherein the pre-sintered ceramic block comprises the following components:

SiO$_2$: 55-85% wt,
Li$_2$O: 12-25% wt,
ZrO$_2$: 0-10% wt,
Al$_2$O$_3$: 0.3-8% wt,
La$_2$O$_3$: 0-7% wt,
ZnO: 0-10% wt,
K$_2$O: 0.1-10% wt,
GeO$_2$: 0.1-7% wt,
nucleating agent: 0-10% wt,
colorant: 0-10% wt, and
other additives: 0-15% wt;
wherein the nucleating agent one of or a combination of at least two of P$_2$O$_5$, TiO$_2$, V$_2$O$_5$, Cr$_2$O$_3$, and Fe$_2$O$_3$, the other additives are one of or a combination of at least two of B$_2$O$_3$, F, Na$_2$O, ZrO$_2$, BaO, SrO, CaO, and MgO; and
wherein the pre-sintered ceramic block contains a silica main crystal phase,
has a Vickers hardness of 0.5-3 GPa,
is opaque, and
exhibits a gradual transmittance and/or color after dense-sintering of 800-1100° C.

10. The pre-sintered ceramic block according to claim 9, wherein the pre-sintered ceramic block has a three-point bending strength of 10-110 MPa.

11. The pre-sintered ceramic block according to claim 9, wherein the pre-sintered ceramic block does not contain a lithium metasilicate crystal phase.

12. The pre-sintered ceramic block according to claim 9, wherein the colorant is a glass colorant or a ceramic colorant.

13. A method for preparing the pre-sintered ceramic block according to claim 9, comprising the steps of:
(1) preparing at least two matrix glass powders with different transmittance and/or color;
(2) putting the prepared at least two matrix glass powder into a mould in the order of transmittance and/or color gradient, and carrying out pressing molding to obtain a matrix glass body; and
(3) pre-sintering the matrix glass body under a vacuum condition to obtain the pre-sintered ceramic block, wherein a sintering temperature during pre-sintering is 530-590° C.

14. The method for preparing the pre-sintered ceramic block according to claim 13, wherein the matrix glass powder comprises the following components:

SiO$_2$: 55-85% wt,
Li$_2$O: 12-25% wt,
ZrO$_2$: 0-10% wt,
Al$_2$O$_3$: 0.3-8% wt,
La$_2$O$_3$: 0-7% wt,
ZnO: 0-10% wt,
K$_2$O: 0.1-10% wt,
GeO$_2$: 0.1-7% wt,
nucleating agent: 0-10% wt,
colorant: 0-10% wt, and
other additives: 0-15% wt;
wherein the nucleating agent is one of or a combination of at least two of P$_2$O$_5$, TiO$_2$, V$_2$O$_5$, Cr$_2$O$_3$, and Fe$_2$O$_3$; the other additives are one of or a combination of at least two of B$_2$O$_3$, F, Na$_2$O, BaO, SrO, CaO, and MgO.

15. The method for preparing the pre-sintered ceramic block according to claim 13, wherein the sintering temperature during pre-sintering is 530-560° C.

16. The method for preparing the pre-sintered ceramic block according to claim 13, wherein a holding time for pre-sintering is 20-240 min.

17. A method for preparing a ceramic block for a dental restoration, comprising the steps of:
preparing the pre-sintered ceramic block of claim 1; and
dense-sintering the pre-sintered ceramic block under a vacuum condition; wherein a temperature during dense-sintering is 800-1100° C.

18. A method for preparing a dental restoration, comprising the steps of:
preparing the pre-sintered ceramic block of claim 1;
processing the pre-sintered ceramic block into a dental restoration shape to obtain a restoration body; and
dense-sintering the restoration body under a vacuum condition to obtain a dental restoration;
wherein a temperature during dense-sintering is 800-1100° C.

* * * * *